United States Patent
Barwicz et al.

(10) Patent No.: US 9,651,747 B1
(45) Date of Patent: May 16, 2017

(54) FIBER PIGTAIL ASSEMBLY WITH INTEGRATED LID ENABLING OPTICAL FIBER MOBILITY

(71) Applicant: International Business Machines Corporation, Armonk, NY (US)

(72) Inventors: Tymon Barwicz, Yorktown Heights, NY (US); Nicolas Boyer, Quebec (CA); Paul F. Fortier, Quebec (CA); Alexander Janta-Polczynski, Quebec (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/049,374

(22) Filed: Feb. 22, 2016

(51) Int. Cl.
*G02B 6/42* (2006.01)
*G02B 6/36* (2006.01)

(52) U.S. Cl.
CPC ......... *G02B 6/4242* (2013.01); *G02B 6/3636* (2013.01); *G02B 6/423* (2013.01)

(58) Field of Classification Search
CPC ..... G02B 6/4242; G02B 6/423; G02B 6/3636
See application file for complete search history.

(56) References Cited

U.S. PATENT DOCUMENTS

| | | | | |
|---|---|---|---|---|
| 7,454,098 B1 * | 11/2008 | Lamprecht | | G02B 6/10 385/129 |
| 8,447,157 B2 | 5/2013 | Carpenter et al. | | |
| 9,316,796 B2 * | 4/2016 | Barwicz | | G02B 6/3861 |
| 9,360,635 B2 * | 6/2016 | Barwicz | | G02B 6/3652 |
| 9,423,561 B1 * | 8/2016 | Chou | | G02B 6/12009 |
| 2003/0081926 A1 * | 5/2003 | Jeong | | G02B 6/30 385/137 |
| 2003/0128931 A1 * | 7/2003 | Kim | | G02B 6/30 385/49 |
| 2005/0254770 A1 * | 11/2005 | Watanabe | | G02B 6/30 385/137 |
| 2006/0291793 A1 * | 12/2006 | Carpenter | | G02B 6/30 385/137 |
| 2012/0219255 A1 * | 8/2012 | Bradley | | G02B 6/3851 385/78 |
| 2013/0064504 A1 | 3/2013 | Chien | | |
| 2013/0209027 A1 * | 8/2013 | Yu | | G02B 6/12 385/14 |
| 2013/0251305 A1 * | 9/2013 | Barwicz | | G02B 6/305 385/14 |
| 2014/0270652 A1 | 9/2014 | Barwicz et al. | | |

(Continued)

FOREIGN PATENT DOCUMENTS

| JP | 06347674 A | 12/1994 |
|---|---|---|
| JP | 2008547057 A | 12/2008 |

*Primary Examiner* — Jerry Rahll
(74) *Attorney, Agent, or Firm* — Cantor Colburn LLP; Vazken Alexanian

(57) ABSTRACT

An optical fiber component includes an optical fiber array and at least one fiber lid. The optical fiber array has a plurality of individual optical fibers extending between a first end and an opposing second end. The fiber lid has a first surface and an opposing second surface. A portion of the second surface is attached to a portion of the optical fiber array adjacent the second end so as to partially define an adhesion region of the optical fiber component and a compliance region of the fiber pigtail assembly to enable high-yield fiber re-alignment in grooves.

20 Claims, 9 Drawing Sheets

(56) References Cited

U.S. PATENT DOCUMENTS

| | | |
|---|---|---|
| 2015/0050028 A1 | 2/2015 | Budd et al. |
| 2015/0177466 A1 | 6/2015 | Barwicz et al. |
| 2015/0286008 A1* | 10/2015 | Shimizu ................. G02B 6/34 385/37 |
| 2016/0011372 A1* | 1/2016 | Barwicz ............. B29D 11/0075 385/139 |
| 2016/0070068 A1* | 3/2016 | Pomerene ................ G02B 6/30 385/14 |

* cited by examiner

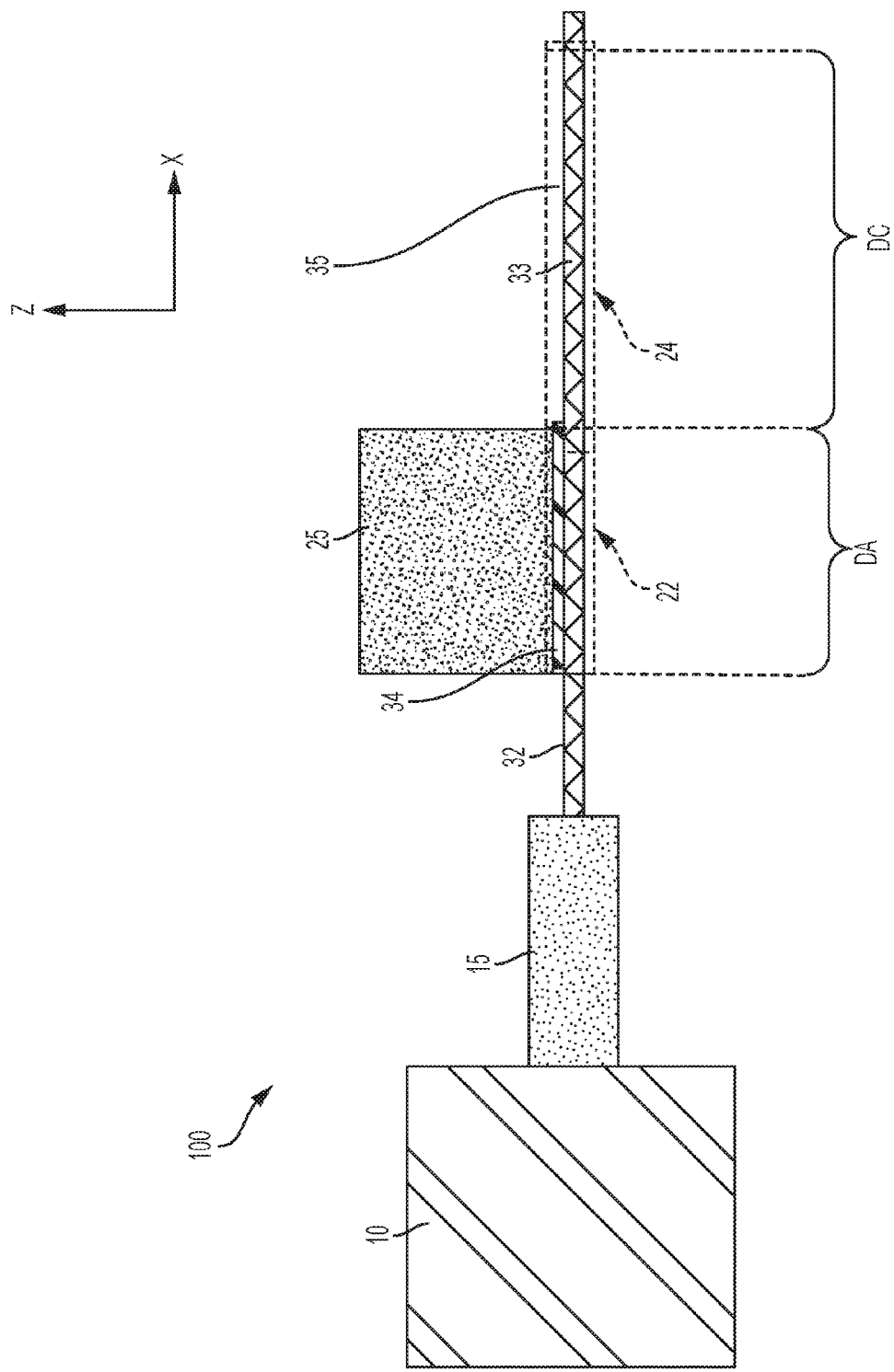

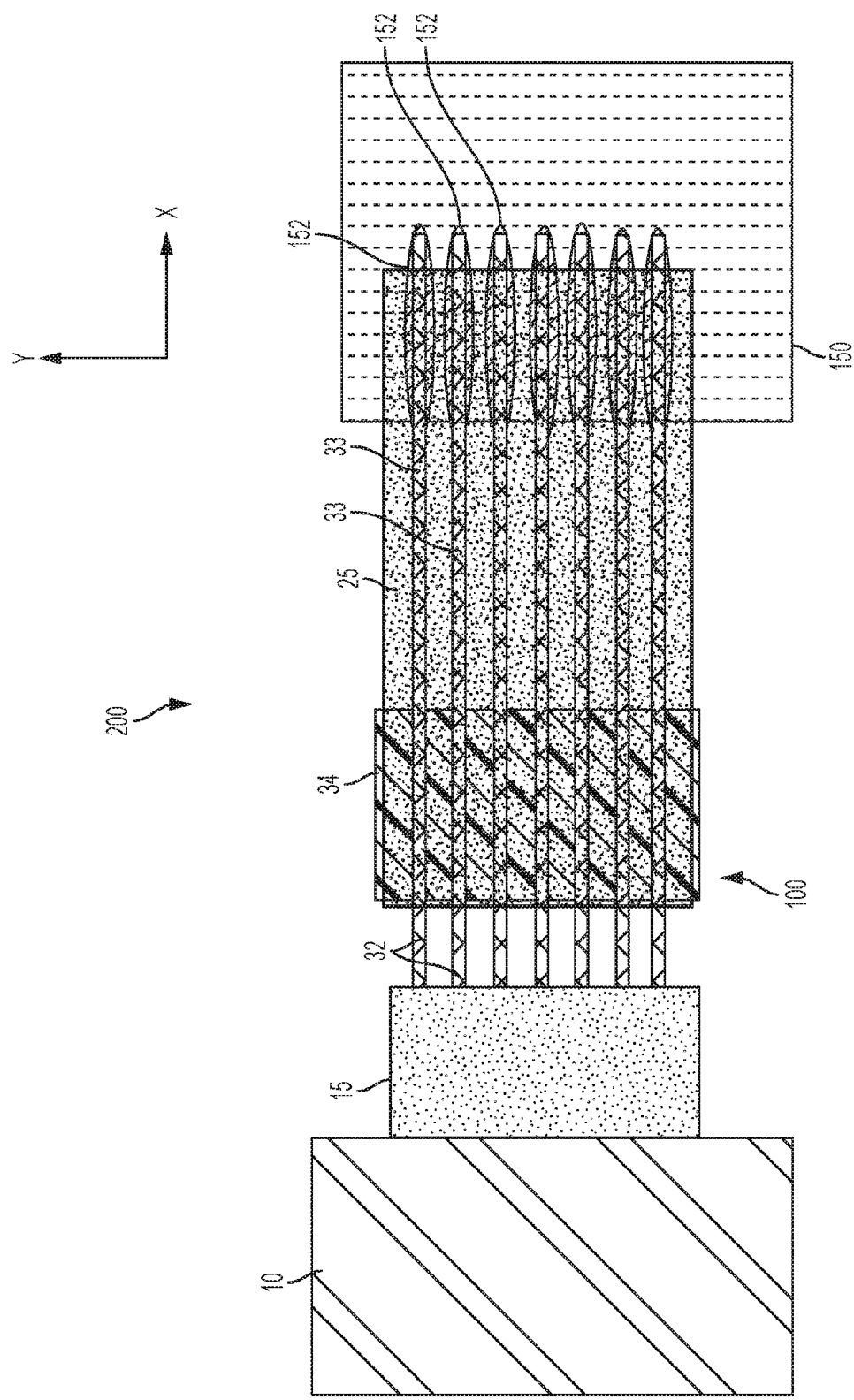

FIBER PIGTAIL ASSEMBLY WITH INTEGRATED LID ENABLING OPTICAL FIBER MOBILITY

BACKGROUND

The invention relates generally to assembly of microelectronic, optoelectronic and photonic components, and more specifically, to a component and chip assembly apparatus configured to optically couple optical fibers to light guides formed in a semiconductor chip.

In various technological fields such as photonics, for example, it may be desired to attach a component having optical fibers to a waveguide coupler included with a photonic device. One such component is typically referred to as an optical fiber pigtail assembly. A cost effective approach to fabricate these fiber pigtail assemblies is to use a high-throughput component and chip assembly apparatus typically referred to as a pick-and-place tool.

Pick-and-place tools often include a picker mechanism that works to pick up the chip component using a motion arm that includes a pick head. The picker brings a portion of the chip components such as, for example, optical fibers, into contact with a substrate or chip (i.e., the part the component will be placed on) which sits on a stationary assembly stage. The optical fibers and the substrate/chip are then aligned in the X and Y-axes (e.g., horizontal axes) and the motion arm moves down in the Z-axis (e.g., vertical axis) to place the chip component on the substrate/chip. The motion arm, however, typically does not have the capability to make a precise horizontal motion to butt-couple the fibers and the waveguide coupler once the optical fibers come into contact with the chip. Moreover, the motion arm does not generally have pressure controls in the horizontal displacement directions (e.g., the X and Y axes) in order to control the force of the butt-couple.

A solution to provide the necessary horizontal motion is to pre-fix a fiber lid to the optical fibers using, for example, adhesive. The adhesive is applied across the entire bottom surface of the lid so as to fixate the lid to the optical fibers (i.e., the fiber array) according to a single adhesive force. Thereafter, the fiber pigtail assembly is picked up and maneuvered to the assembly stage such that the fiber array and the fiber lid are brought into contact with the chip.

SUMMARY

According to a non-limiting embodiment, an optical fiber component includes an optical fiber array and at least one fiber lid. The optical fiber array has a plurality of individual optical fibers extending between a first end and an opposing second end. The fiber lid has a first surface and an opposing second surface. A portion of the second surface is attached to a portion of the optical fiber array adjacent the second end so as to partially define an adhesion region of the optical fiber component and a compliance region of the fiber pigtail assembly to enable high-yield fiber re-alignment in grooves.

According to another non-limiting embodiment, a photonic device comprises a semiconductor chip optically coupled to a fiber pigtail assembly. The semiconductor chip comprises a first surface including a plurality of grooves formed therein, and a plurality of waveguide couplers. Each waveguide coupler includes a first end fixated to the first surface and an opposing second end that extends along a first axis into a respective groove. The fiber pigtail assembly comprises an optical fiber array including a plurality of individual optical fibers extending between a first end and an opposing second end. A fiber optic ferrule supports the first end of end of the optical fibers, and a fiber lid extends between an outer lid side and an opposing inner lid side to define a first surface and an opposing second surface. A primary adhesion region is interposed between the second surface and a portion of the optical fiber. The primary adhesion region extends from an outer edge that is adjacent the second end to an inner edge that terminates ahead of the semiconductor chip. A distance between the inner end of the primary adhesion region and the inner side of the lid defines a compliance region that excludes the primary adhesion region.

According to still another non-limiting embodiment, a method of controlling a force applied to a fiber array included in an optical fiber pigtail assembly comprises assembling an optical fiber array including a plurality of individual optical fibers extending between a first end and an opposing second end. The method further includes fixating the first end of the optical fibers to a fiber optic ferrule, and attaching a lower surface of a fiber lid to a portion of the optical fiber array so as to form an adhesion region and a compliance region. The adhesion region includes a first adhesive layer defining a first adhesion strength, and the compliance region has a second adhesion strength that is less than the first adhesion strength.

Additional features are realized through the techniques of the present invention. Other embodiments are described in detail herein and are considered a part of the claimed invention. For a better understanding of the invention with the features, refer to the description and to the drawings.

BRIEF DESCRIPTION OF THE DRAWINGS

FIG. 1E illustrates another embodiment of the fiber pigtail assembly;

FIG. 2A is a top view of a photonic device including a fiber pigtail assembly coupled to a chip according to a non-limiting embodiment;

DETAILED DESCRIPTION

Figure 1A:
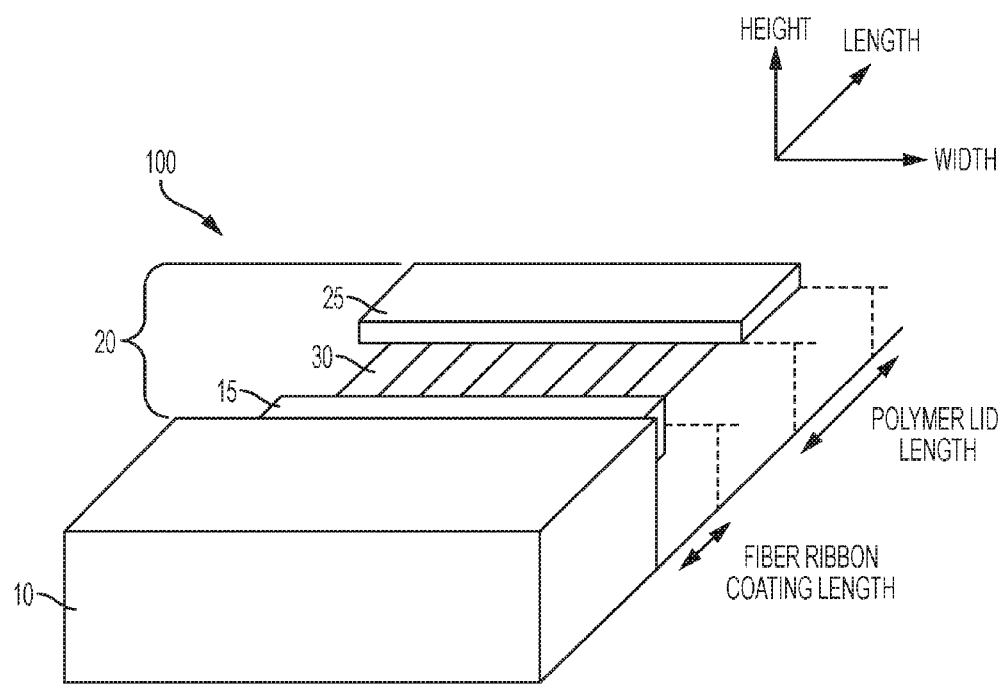
FIG. 1A illustrates a perspective view of a fiber pigtail assembly according to a non-limiting embodiment.
Figure 1B:
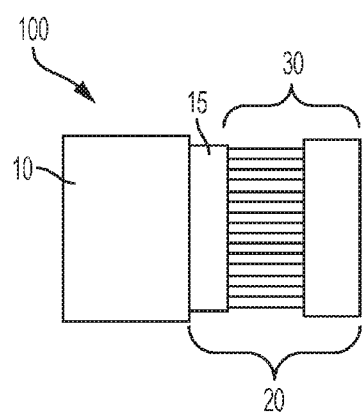
FIG. 1B illustrates a top view of the fiber pigtail of FIG. 1A according to a non-limiting embodiment.
Figure 1C:
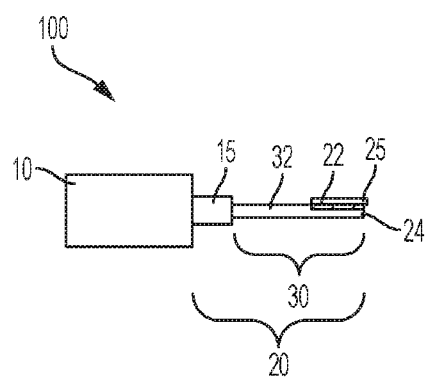
FIG. 1C illustrates a side view of the fiber pigtail assembly of FIGS. 1A-1B according to a non-limiting embodiment.

Various non-limiting embodiments of the invention provide an optical fiber array including an optical fiber lid coupled thereto. Conventional pigtail assemblies include an adhesive layer to fixate the optical fiber lid to the fiber array. If the adhesive is too compliant, the adhesive will stretch when the horizontal force used to butt-couple the fibers to the waveguide couplers is applied to the lid. Consequently, the optical fibers may not properly align within their respective chip grooves and may not come into contact with the waveguide coupler. Unlike conventional optical fiber pigtail assemblies, at least one embodiment provides a fiber pigtail assembly that includes a compliant region formed between the lower surface of the optical lid and the fiber array.

The compliant region has a lower adhesion, and/or frictional force, or even no coupling to the lid to enable and/or improve fiber mobility, than the adhesive region which retains the lid to the fiber for manipulation while also providing a means to apply the translation movement. In this manner, the compliant region is configured to perform fiber alignment correction while also providing some displacement release that can protect the fragile waveguide couplers from excessive force during the butt-coupling process. This compliant region also reduces the frictional force of the sliding/butting motion of the fiber when they are inserted in the V-groove. The lid over the fiber ensures that the fibers are properly pushed down in the V-groove for the self-realignment process, but serves to reduce or even prevent adhesive climbing on the pick tip manipulator.

In at least one embodiment, the compliancy region enables free movement of the loose fibers (e.g., the fiber tips) so as to reduce the force needed to realign the fibers. According, deformation of the optical fibers may be maintained within bending limit parameters without being inhibited by the strength of the adhesive. In this manner, a more rigid and high-adhesion adhesive may be utilized while still allowing for proper butt-coupling between the optical fibers and the waveguide couplers. In addition, an adhesive can be chosen as a maximal force limiter to protect the fragile structure of the waveguide and to allow for more fiber butt-coupling in scenarios where the optical fiber array includes non-uniform fiber lengths. The first fiber being butted having a higher individual force that will break the coupling adhesion to the lid to release the force on that particular fiber while the others are stilling in butting process.

With reference now to FIGS. 1A-1D, a fiber pigtail assembly 100 which can be incorporated into any system and be attached to a photonic die or any type of substrate is illustrated according to a non-limiting embodiment. The fiber pigtail assembly 100 includes a fiber optic ferrule 10, a fiber optic ribbon 20 which includes a fiber array 30 comprising a plurality of bare (i.e., uncovered) single-mode optical fibers 32 extending from inside the ferrule 10, an optical fiber ribbon coating 15 surrounding part of the fiber optic ribbon 20, and an integrated fiber lid 25. The fiber array 30 is not limited to any particular number of optical fibers 32. The fiber lid 25 extends in a first direction (e.g., the X-axis) between opposing first and second ends and parallel with the optical fibers 32 to define a lid length. The lid length may be, for example, approximately 2-4 millimeters (mm). According to a non-limiting embodiment, the fiber array 30 is attached to the fiber lid 25 so as to define an adhesion region 22 and a compliancy region 24. The compliancy region 24 has a lower or no adhesive force with respect to the adhesion region 22. The adhesive force can be defined, for example, according to level of friction (i.e., a frictional coefficient) existing at a particular region. For example, the adhesion region 22 has a first frictional coefficient, while the compliancy region 24 has a second frictional coefficient that is less than the first coefficient. The adhesion region 22 can also have a force limiting design that still is strong enough to enable the fiber sliding in the V-groove for butting, but limit the maximal force applicable on the mode coupler to protect it.

In at least one embodiment, the adhesion region 22 is defined by a first region including an adhesive layer 34 that attaches the fiber lid 25 to a portion of the optical fibers 32. Accordingly, the adhesion region 22 has adhesion strength related to the adhesive layer 34. The compliancy region 24, however, is defined by a second region that excludes the adhesive layer 34 (see FIG. 1D). Accordingly, the ends of the optical fibers 32 are then free to move so as to reduce the force needed to perform the self-realignment of the fibers with respect to grooves n the chip as discussed in greater detail below. This compliant region takes into account the bending force and displacement clearance to perform the required process realignment.

Figure 1D:
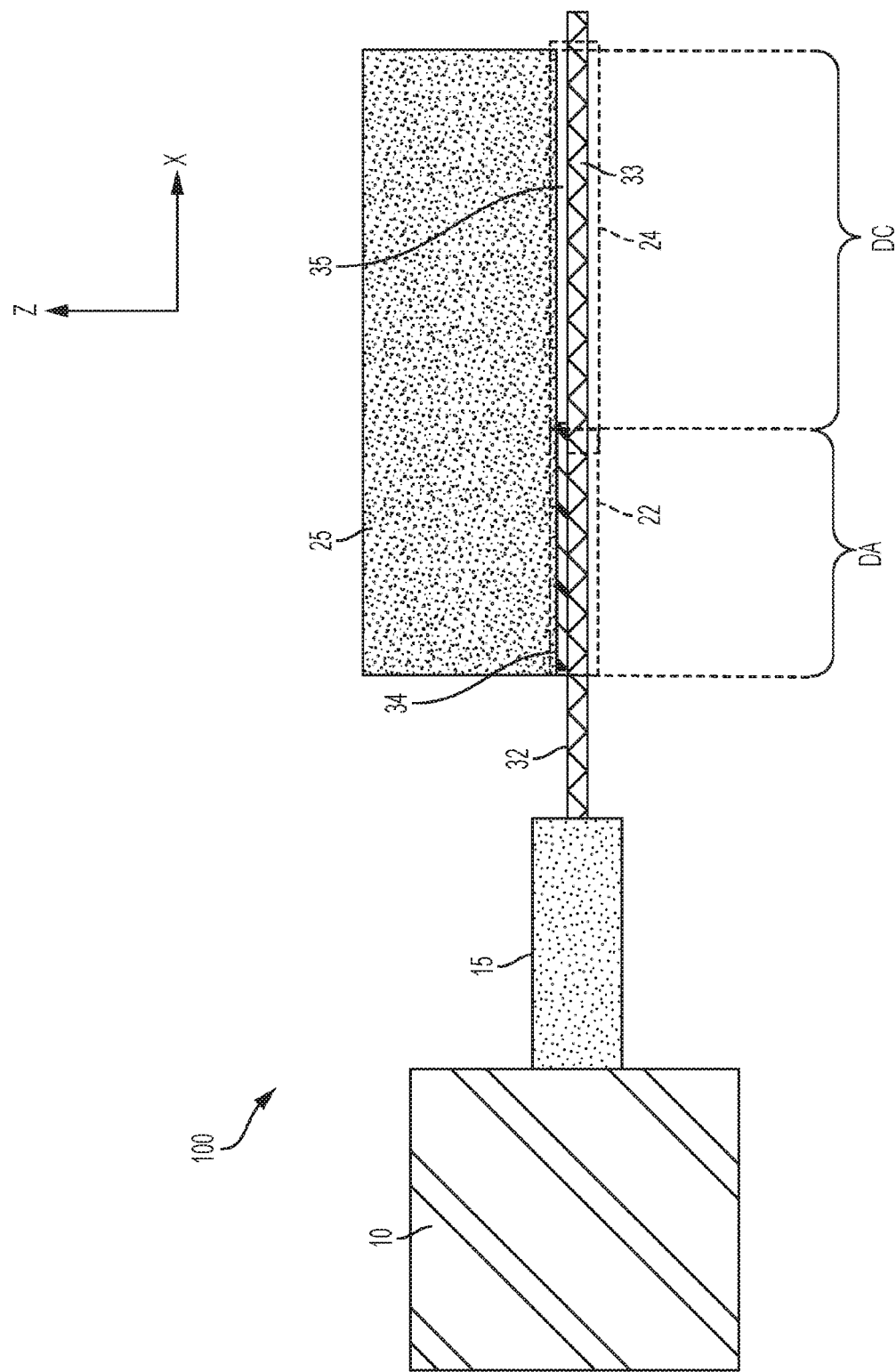
FIG. 1D illustrates a closer side view of the fiber pigtail assembly shown in FIGS. 1A-1C.

As further illustrated in FIG. 1D, the fiber optic ribbon 20 terminates at one distal end with the fiber optic ferrule 10 and on the other distal end with bare fibers 32. The integrated fiber lid 25 contacts and is bonded to the bare fibers 32 at the adhesion region 22 using, for example, an adhesive layer 34. The fiber optic ribbon 20 is coated with the optical fiber ribbon coating 15 near the transition to the fiber optic ferrule 10. The fiber optic ferrule 10 includes bare fibers from the fiber optic ribbon 20. The fiber optic ribbon 20 extends from the fiber optic ferrule 10 and terminates under the integrated fiber lid 25. The bare fibers 32 originate from the optical fiber ribbon coating 15 and terminate underneath the integrated fiber lid 25. In another embodiment, the bare fibers 32 protrude beyond the fiber lid 25. In at least one embodiment, the integrated fiber lid 25 retains the bare fibers 32 (of the fiber optic ribbon 20) at a predetermined spacing. For example, each of the bare fibers 32 may be attached to the fiber lid 25 at a pitch of about 125 to about 500 microns and preferably at a pitch of approximately 250 microns. This allows the bare fibers 32 to be accurately spaced at a standard pitch, and be available for connection to a photonic chip with a matching pitch, or substantially matching pitch.

In at least one embodiment, the bare fibers 32 may be accurately positioned in matching grooves (e.g., U-grooves or V-grooves) formed in the chip to ensure the predetermined spacing. For accurate placement of the bare fibers 32 to a chip on a wafer, it is preferable to hold the bare fibers 32 as close as possible to the section of the fibers to be placed (i.e., support the bare fibers 32 at the end/tip). The fiber lid 25 is an innovative and low-cost approach for a structure that acting as a means to hold the fiber pigtail 100 device at the adhesion region 22.

The integrated fiber lid 25 may be made of various materials including, but not limited to, polyethylene terephthalate (PET), fluorinated ethylene propylene (FEP) or other polymers. The integrated fiber lid 25 is preferably transparent to ultraviolet (UV) light in order to allow the use of a UV-curable material as the adhesive to glue/attach the bare fibers 32 to the photonic device through the fiber lid 25. The bare fibers 32 of the fiber ribbon 20 are each attached/glued to the fiber lid 25 by an adhesive. Since the fiber lid 25 is transparent to UV light, once the bare fibers 32 of the fiber optic ribbon 20 are fixed in place with the UV-curable material, UV light is irradiated through the fiber lid 25 to cure the UV-curable material with the fibers 32.

The integrated fiber lid 25 may have a width of about 3.0 (mm) and the width of the fiber optic ferrule 10, but preferably about 3.4 mm. The width of the fiber lid 25, however, may vary based on the number of optical fibers 25. The integrated fiber lid 25 may have a length, for example, ranging between about 0.5 mm and the length of the bare fibers 32 (of the fiber optic ribbon 20) but preferably 2 mm. The thickness of the integrated fiber lid 25 may range, for example, from about 25 to about 1000 micrometers (μm), and preferably 100 μm. In at least one embodiment, the fiber ribbon length exterior to the fiber ferrule 10 may range, for example, from about 2 and to about 50 mm, and preferably 5 or 10 mm. The length of the fiber ribbon coating 15 may range, for example, about 0 mm to about 50 mm, and preferably 2 to 4 mm.

Still referring to FIG. 1D, at least one embodiment the adhesion region 22 has a first length (DA) and the compliant region has a second length (DC) that is greater than the first length (DA). The length (DA) of the adhesion region 22 may range, for example, from approximately 1.0 mm to approximately 1.5 mm. The length (Dc) of the compliance region 24 may range, for example, from approximately 1.6 mm to approximately 2.6 mm. In at least one embodiment, the length (Dc) of the compliance region 24 is twice the length (DA) of the adhesion region 22. In at least one embodiment, the compliant region 24 enables minimal restriction the self-realignment process of the fiber into the V-groove with fiber bending. In addition, the adhesion region 22 enables manipulation and force transmission to the fiber in the assembly process for realignment and butting. Geometric rules can be defined for those region lengths, depending of pitch correction to be attaint, adhesive strength, process force and specifications.

In another embodiment illustrated in FIG. 1E, the fiber lid 25 does not extend beyond the adhesion region 22. Accordingly, an exposed region may exist which extends from the adhesion region 22 to the exposed terminated ends of the optical fiber 32. In addition, a separate lid (not shown) could be attached to the exposed region during fiber to chip assembly if required by the assembly process for proper fiber settling in v-grooves. In at least one embodiment, the second lid is excluded from the initially fabricated fiber pigtail 100.

Figure 2B:
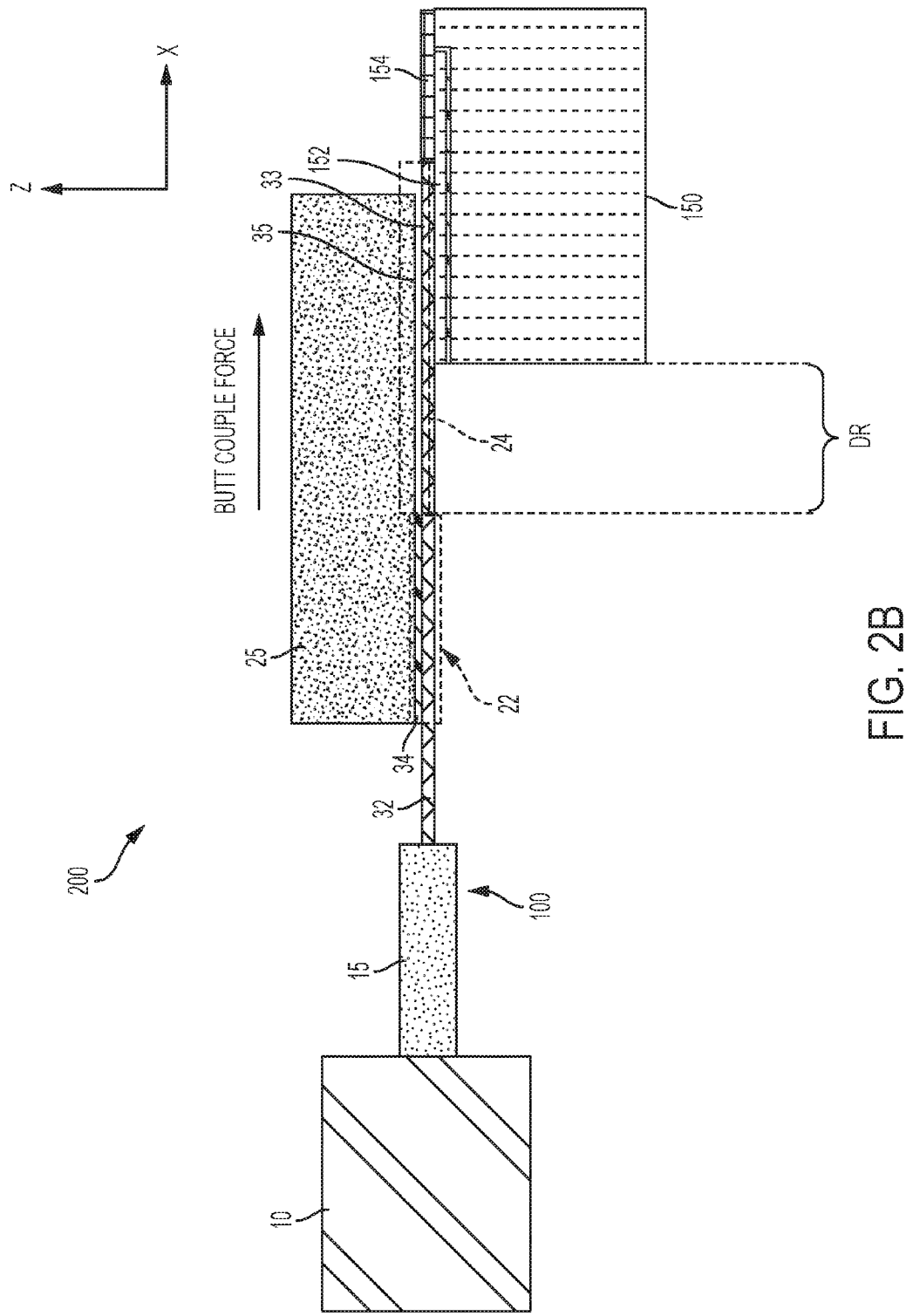
FIG. 2B is a side view of the photonic device of FIG. 2A according to a non-limiting embodiment.

Turning now to FIGS. 2A-2B, a photonic device 200 including a fiber pigtail assembly 100 coupled to a chip 150 is illustrated according to a non-limiting embodiment. The chip 150 includes a plurality of grooves 152 (e.g., U-grooves or V-grooves) and a plurality of waveguide couplers 154. The grooves 152 extend parallel with respect to the optical fibers 32 (e.g., along the X-axis) to define and length and have a groove pitch that matches or substantially matches the fiber pitch defined by the fiber array 30 to ensure the predetermined spacing of the optical fibers 32 with respect to the grooves 152. The length of the grooves may range from approximately 0.5 mm to approximately 4.0 mm. Each waveguide coupler 154 may be formed as waveguide, for example a single-mode waveguide, and extends into a respective groove 152 and is configured to optically couple (i.e., butt-couple) with a corresponding optical fiber 32 disposed in the groove 152. It should be appreciated that the embodiments are not limited to a single-mode waveguide. Accordingly, energy (e.g., light) traveling through the optical fibers 32 can be coupled to a waveguide 154 formed in the chip 150 via the fiber pigtail assembly 100 having an integrated fiber lid 25. The fiber lid 25 extends between an outer lid side and an opposing inner lid side to define a first surface and an opposing second surface. In at least one embodiment, each waveguide coupler 154 is formed as a single-mode optical waveguide, which is configured to guide energy (e.g., light) according to one transverse electric mode and one transverse magnetic mode.

The fiber pigtail assembly 100 includes a fiber optic ferrule 10, a fiber array 30 comprising a plurality of bare single-mode optical fibers 32, an optical fiber ribbon coating 15 supporting a portion of the fiber array 30, and an integrated fiber lid 25. In at least one embodiment, an optical mode in a single-mode optical fiber 32 may have a diameter ranging from about 3 μm to about 15 μm, and preferably about 9 μm. The single-mode waveguide coupler 154 may have a mode width or height ranging from about 0.2 μm to about 2 μm and preferably about 0.5 μm. An optical mode converter (not shown) may be included so as to transition the mode shape from the mode shape of a fiber (at the distal end of the mode converter that is in proximity to a fiber) to the mode shape of a single-mode waveguide 154 as understood by those skilled in the art. The single-mode waveguide coupler 154 on the chip 150 may be surrounded by a cladding material of refractive index similar to the fiber glass material of the optical fiber 32. In at least one embodiment, the cladding material may include a lower refractive index than the single-mode waveguide 154 (i.e., waveguide core), and an upper cladding has a refractive index that is lower than the single-mode waveguide coupler 154.

According to a non-limiting embodiment, the fiber array 30 is attached to the fiber lid 25 so as to define an adhesion region 22 and a compliancy region 24. The adhesion region 22 has an adhesion strength while the compliancy region 24 has lower or no adhesion to ease the fiber mobility at the self-alignment process. Accordingly, the ends of the optical fibers 32 are free to move so as to reduce the force needed to realign the fibers with respect to grooves 152 formed in the chip 150. In at least one embodiment, the required fiber holding force in the adhesion region is 0.0N1 newtons (N) to 20N or 0.1N to 0.2N in the direction lateral to the fibers. This holding force must be strong enough to sustain the reactive force of fiber bending at re-alignment. The holding force longitudinal to the fibers must be strong enough to withstand the frictional reactive force of fibers sliding in grooves during fiber butting. In one embodiment, it would be between 0.01 and 20N. In another embodiment, this longitudinal holding force can also be chosen small enough to protect the mode coupler interface from excessive butting force. In one embodiment it could be between 0.01 and 0.2 N.

Figure 3:
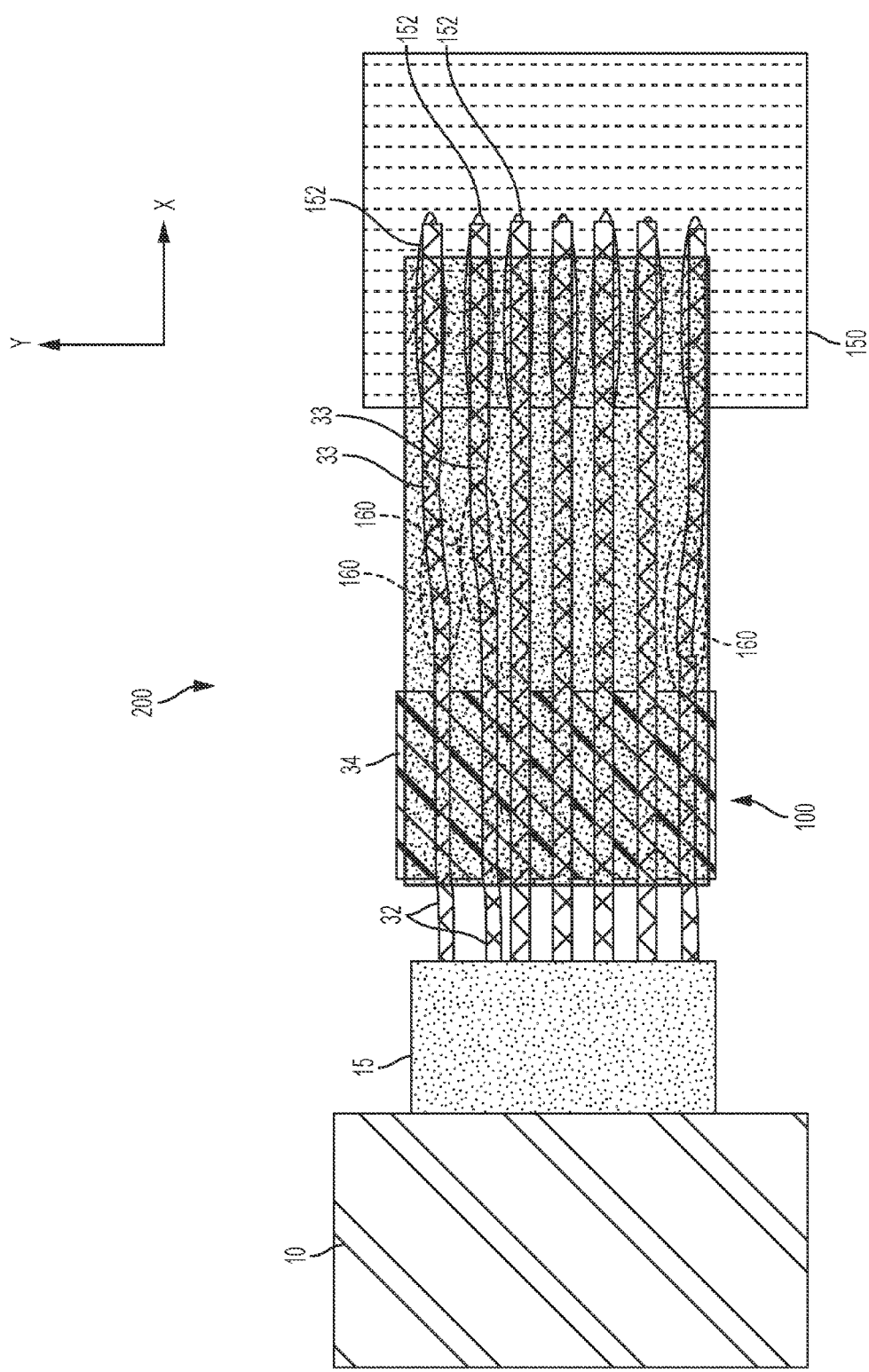
FIG. 3 illustrates the bending limits of the optical fibers included in a fiber pigtail assembly according to a non-limiting embodiment.

In at least one embodiment further illustrated in FIG. 2B, the adhesion region 22 is defined by a first region including an adhesive layer 34 that attaches the fiber lid 25 to a portion of the optical fibers 32. Accordingly, the adhesion region 22 has adhesive strength from the adhesive layer 34. The compliancy region 24, however, is defined by a second region that excludes the adhesive layer 34. The compliancy region 24 also defines pressing zone 35 existing between the fiber lid 25 (e.g., the lower surface of the fiber lid 25) and the optical fibers (e.g., the upper surface of the optical fibers 32 facing the lower surface of the lid 25). Since the compliancy region 24 excludes the adhesive layer 34, a frictional and bending force occurs on fibers in the compliancy region 24 even up to the adhesion region 22 at the assembly process to the photonic die. In this manner, deformation of the optical fibers 32 may be apply and maintained within bending limit parameters without being inhibited by the strength of the adhesive layer 34 (see FIG. 3). That is, a flexed portion 160 of the optical fibers 32 is allowed to bend within an acceptable range of bending radii indicated by the technical specifications of the optical fibers 32 without altering the performance of the fibers 32 themselves. Those maximal allowable bend radii are include in the design of the maximal implies force and also the failure yields for the case of more aggressive design. For example, a 100 kpsi optical fiber of 1 m can yield 1 ppm with 16 mm bending radii. In addition, a more rigid and high-adhesion adhesive layer 34 may be utilized to allow for proper butt-coupling between the optical fibers 32 and the waveguide couplers 154. Fiber bending in the compliant region allows the butting of all the fiber tips of the fiber array even if some length variation of the fiber tips exists.

Referring still to FIG. 2B, the adhesive layer 34 is interposed between the second surface of the fiber lid 25 and a portion of the optical fibers 32. The adhesive layer 34 extends from an outer adhesive edge (adjacent the second end of the lid 25) to an inner edge of the adhesive layer 34 which terminates ahead of the semiconductor chip 150. According to at least one non-limiting embodiment, a distance between the inner end of the adhesive layer 34 and the inner side of the lid 25 defines a compliance region 24 that excludes the primary adhesive layer 34. As described above, the adhesive layer 34 defines an adhesion region 22 of the fiber pigtail assembly 100 having a first adhesion strength and the compliance region 24 of the fiber pigtail assembly 100 to perform fibers self-alignment and butting correction with bending. As further illustrated in FIG. 2B, a non-attached region is defined according to a distance (DR) between the chip 150 and the inner edge of the adhesive layer 34. That is, the non-attached region may be understood as a region beneath a section of the compliance region 24 located between the inner edge of the primary adhesive layer 34 and the semiconductor chip 150, at which the chip 150 is excluded (i.e., does not extend therebeneath).

Figure 4:
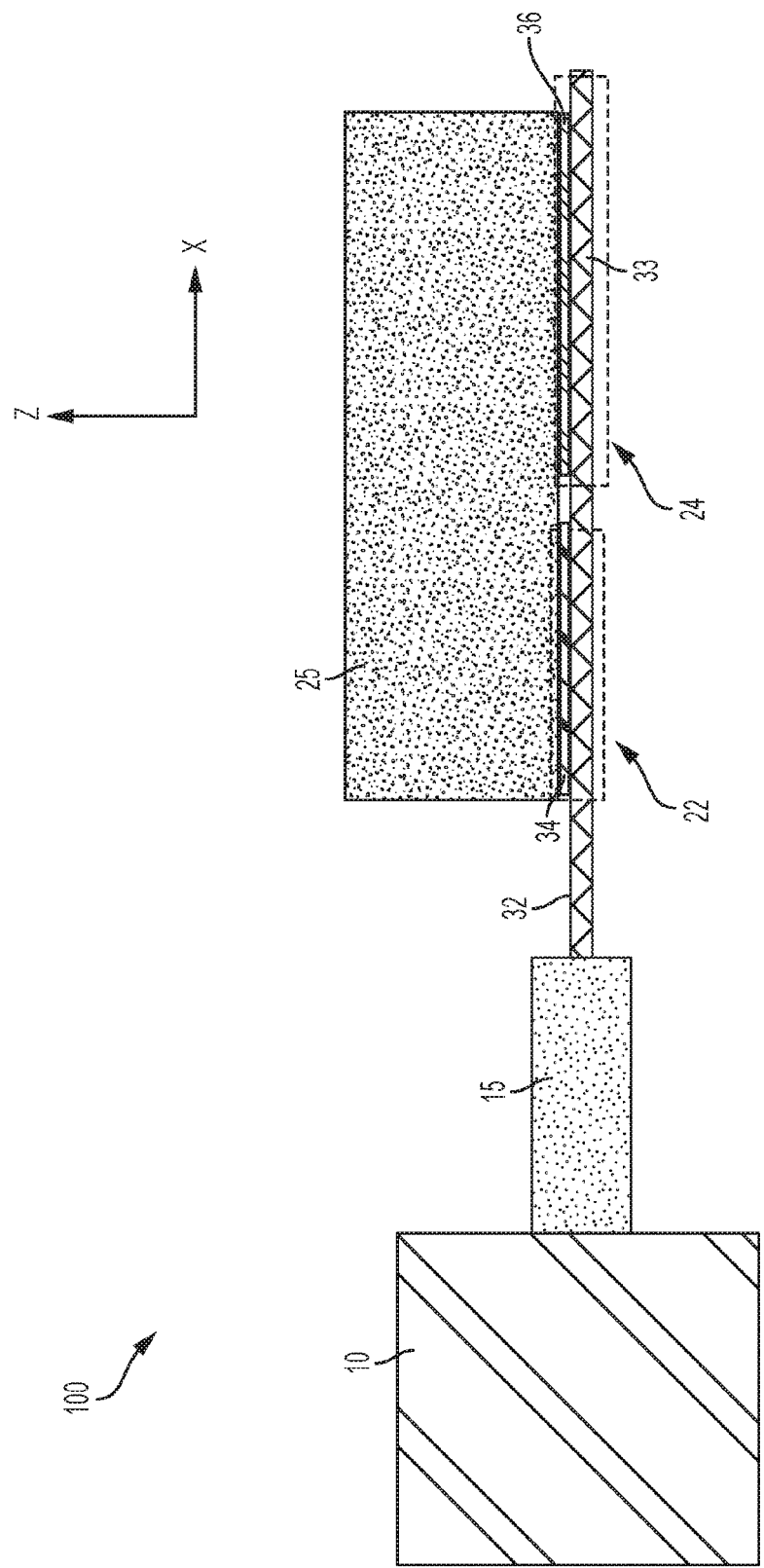
FIG. 4 is a side view of the fiber pigtail assembly according to another non-limiting embodiment.

Turning now to FIG. 4, the pigtail assembly 100 is illustrated according to another non-limiting embodiment. As described, the adhesion region 22 is defined by a first region including a first layer of adhesive 34 (e.g., a primary adhesive layer 34) that attaches the fiber lid 25 to a portion of the optical fibers 32. Accordingly, the adhesion region 22 has a strength related to the primary adhesive layer 34. The compliancy region 24, however, has a second layer of adhesive 36 (e.g., a secondary adhesive layer 36). In at least one embodiment, the adhesion region 22 is spaced apart from the compliancy region 24 by a distance to define a void. The void located between the adhesion region 22 and the compliancy region is not limited to any particular distance.

According to a non-limiting embodiment, the secondary adhesive layer 36 is formed from an adhesive material that has a lower strength than the primary adhesive layer 34. For example, the primary adhesive layer 34 is formed from of a stiffer adhesive and stronger strength, as to be sufficient to handle the forces during assembly force without significant plastic deformation, while the secondary adhesive layer is weaker to allow easy fiber re-alignment. Typical adhesive strength values are between 0 to 100 kpsi. In at least one embodiment, the primary adhesion layer shows an adhesive strength of 3400 psi and the secondary layer shows an adhesive strength of 100 psi. In this manner, the compliance region 24 has a second frictional coefficient that is less than the first frictional coefficient of the adhesion region 22. Accordingly, the ends of the optical fibers 32 are free to move so as to reduce the force needed to realign the fibers 32 with respect to grooves 152 formed in a chip 150 when performing the assembly process of the fiber self realignment in the V-groove, but still allow a butt-coupling process as described in detail above.

Still referring the FIG. 4, the primary adhesive layer 34 and the secondary adhesive layer 36 may also define different tensile strengths with respect to one another. In at least one embodiment, for example, a first layer of adhesive 34 corresponding to the adhesion region 22 may have a first tensile strength, while a second layer of adhesive 36 corresponding to the compliancy region 24 may have a second tensile strength that is less than the first tensile strength. The first tensile strength may range, for example, from approximately 20.0 megapascals (MPa) to approximately 50 MPa, while the second tensile strength may range, for example, from approximately 0.0 MPa to approximately 4 MPa.

The second layer of adhesive 36 (e.g., the weaker adhesive layer 36) is configured allow the fiber lid 25 to separate while the optical fibers 32 are realigned in grooves during the butt-coupling process. In this manner, the second adhesive layer 36 may improve the handling of the pigtail assembly 100 when contact the chip, while also serving to improve pitch control of the optical fibers 32 coupled to the chip not shown if FIG. 4) during the assembly process. In addition, the second layer of adhesive 36 (e.g., the weaker adhesive layer 36), may allow the fiber lid 25 to separate as the waveguide couplers (not shown if FIG. 4) are forced against the optical fibers during the butt-coupling process. Accordingly, a portion of the lid 25 may separate from the optical fibers 32 if the force exceeds the tensile strength of the second adhesive layer 36, thereby reducing the possibility of damaging one or more of the waveguide couplers.

Figure 5:
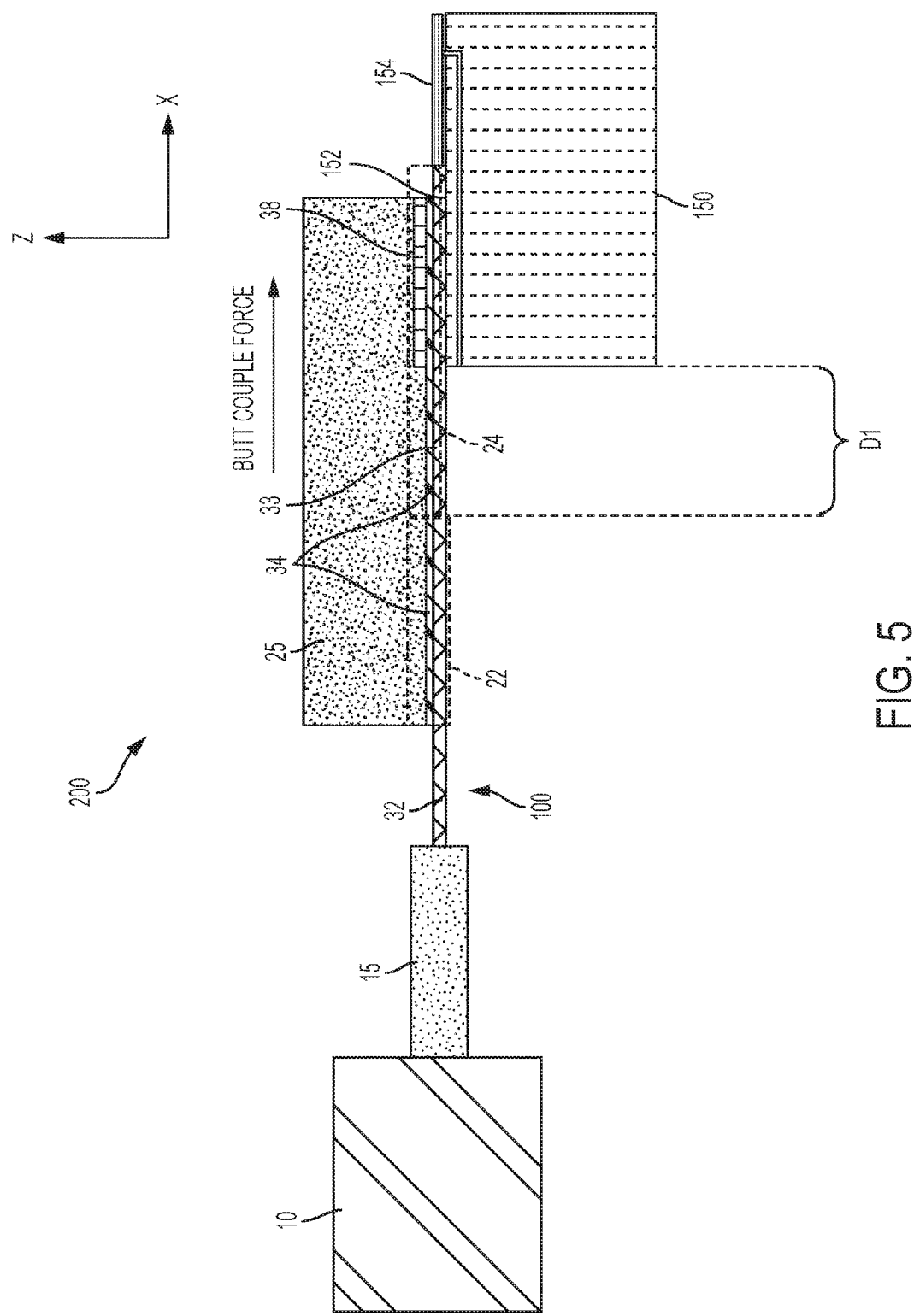
FIG. 5 is a side view of a photonic device of according to another non-limiting embodiment.

Turning to FIG. 5, the pigtail assembly 100 is illustrated according to another non-limiting embodiment. As described, the compliancy region 24 may have a second tensile strength that is less than the first tensile strength of the adhesion region 22. In at least one embodiment illustrated in FIG. 5, the lower tensile strength of the compliancy region 24 may be achieved by forming a breakaway region 38 in the compliancy region 24. The breakaway region 38, however, is formed in the chip attach region (i.e., the region where the chip 150 extends beneath the optical lid 25 and the optical fibers 32). In at least one embodiment, the breakaway region 38 may also exist in the D1 compliancy region.

The breakaway region 38 may be formed, for example, by treating the lower surface of the fiber lid 25 so as to weaken the tensile strength of the adhesive layer 34 at the region located between the fiber lid 25 and the fiber in the compliancy region and the chip 150 (i.e., the chip attach region), while maintaining the rated tensile strength provided by the adhesion layer 34 located away from the breakaway region 38 and compliancy region D1 The treatment used to form the breakaway region 38 may achieved in various manners including, but not limited to, etching the lower surface of the fiber lid 25, reducing the effective adhered area, applying an adhesive reducing substance, and/or performing surface treatment to enhance adhesion of layer 34 except at weaken region 38 and D1

Figure 6:
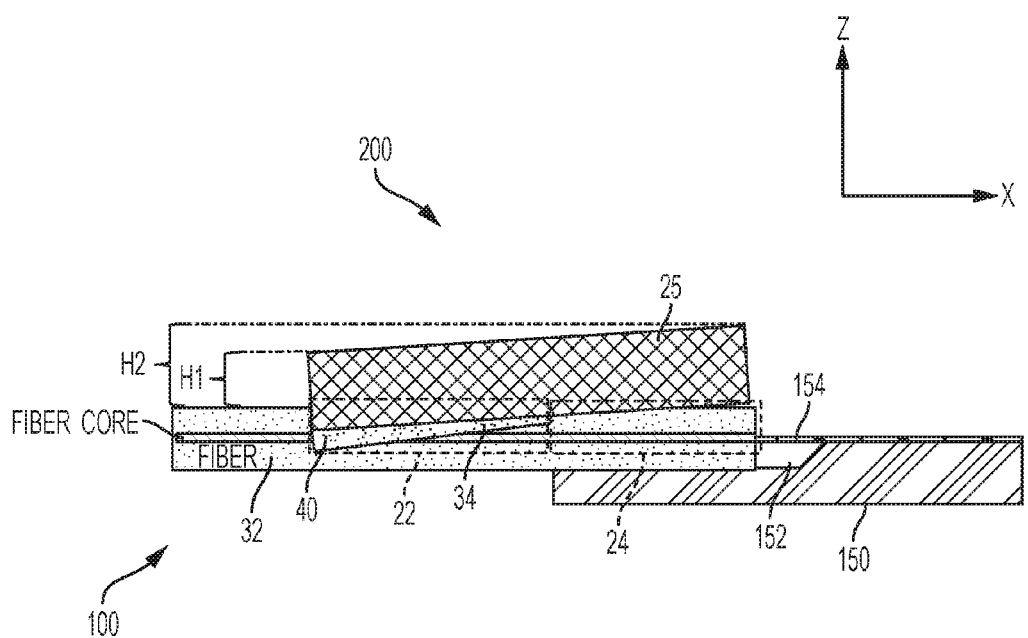
FIG. 6 is a side view of a photonic device of according to another non-limiting embodiment.

Referring now to FIG. 6, the pigtail assembly 100 is illustrated according to another non-limiting embodiment. In this embodiment, a compliancy region 24 having a lower adhesion force, i.e., a lower tensile strength, than the first tensile strength of the adhesion region 22 is achieved using a fiber lid 25 that is positioned at a gradient or incline with respect to the optical fibers 32. As further illustrated in FIG. 6, for example, the fiber lid 25 includes a gradient or inclined portion 40 that positions the fiber lid 25 at an angle with respect to the optical fiber array (i.e., the optical fibers 32). In at least one embodiment, the angle ranges, for example, from approximately 0.1 to approximately 5 degree. Accordingly, the fiber lid enables insertion of the fiber array ribbon therein, thereby allowing more structural force at the adhesion region 22 when manipulating the component with the lid 25.

The inclusion of the lid 25 over the fibers 32 can also enable more process to include the lid 25 on the fiber array 30. The lid 25 can also bend on the fiber array 30 over the chip for the v-groove for the realignment at the assembly process. The lid 25 may also serve as manipulation feature with a UV-curable material barrier.

The gradient portion 40 may be formed using the adhesive layer 34 and/or shaping the second surface (e.g., lower surface) of the fiber lid 25. Accordingly, a first end of the lid 25 is positioned at a first height (H1) and an opposing second end of the lid 25 is positioned at a second height (H2) that is greater than the first height (H1). The higher second end (H2) of the lid 25 realizes the weaker frictional force and/or tensile strength compared to the lower first end (H1) of the lid 25. Accordingly, an adhesion region 22 is formed near the the lower first end (H1) of the lid 25, while a compliancy region 24 is formed near the second higher end (H2). In at least one embodiment, the adhesive layer 34 may deposited near the lower first end (H1) so as to define an adhesion region 22, whereas the region near the higher second end (H2) of the lid 25 excludes the adhesive layer 34. In another non-limiting embodiment, the gradient lid embodiment illustrated in FIG. 6 may include a first adhesive layer in the adhesive region and a second adhesive layer having a different strength in the compliance region 24 as described in detail above.

Accordingly, various non-limiting embodiments provide an optical fiber array including an optical fiber lid coupled thereto. Unlike conventional optical fiber pigtail assemblies, at least one embodiment provides a fiber pigtail assembly that includes a compliant region formed between the lower surface of the optical lid and the fiber array. The compliant region has a lower or none adhesion force than a first adhesion region (i.e., a region at which an adhesive layer exists). In addition, the compliant region may have a lower adhesive strength compared to the first adhesive region. In this manner, the compliant region is capable of performing optical fiber alignment correction while also protecting the fragile waveguide couplers from realizing excessive force during the butt-coupling process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optical fiber component, comprising:
    an optical fiber array including a plurality of individual optical fibers extending between a first end and an opposing second end; and
    at least one fiber lid including a first surface and an opposing second surface, a portion of the second surface attached to a portion of the optical fiber array adjacent the second end so as to partially define an adhesion region of the optical fiber component and a compliance region of the optical fiber component to enable high-yield fiber re-alignment in grooves.

2. The optical fiber component of claim 1, wherein the adhesion region shows an adhesion strength and stiffness of the fibers coupling to the lid, and the compliance region having at least one of a lower adhesion strength and a weaker modulus than the first region to enable fiber mobility for high-yield fiber re-alignment in grooves.

3. The optical fiber component of claim 2, wherein the adhesive region has a first length and the compliant region has a second length, the first length ranging from about 0.2 mm to about 2.4 mm, and the second length ranging from about 0.25 mm to about 4 mm.

4. The optical fiber component of claim 2, wherein the compliant region includes a second layer of adhesive different from the first layer of adhesive, the first layer of adhesive having a first strength and the second layer of adhesive having a second lower strength.

5. The optical fiber component of claim 2, wherein the first adhesive withstands a force ranging from about 0.1 newtons (N) to about 2.0N.

6. The optical fiber component of claim 2, wherein a region where the fibers are not attached to the lid in the compliant region so as to create an adhesion strength below about 0.01N per fiber.

7. The optical fiber component of claim 2, wherein the first adhesion region is achieved by molding the lid on the fibers.

8. The optical fiber component of claim 7, wherein the second surface includes a gradient portion that angles the fiber lid with respect to the optical fiber array and displaces a first end of the lid at a first height and an opposing second end of the lid at a second height greater than the first height.

9. A photonic device, comprising:
    a semiconductor chip optically coupled to a fiber pigtail assembly,
    wherein the semiconductor chip comprises:
        a first surface including a plurality of grooves formed therein;
        a plurality of waveguide couplers, each waveguide coupler including a first end fixated to the first surface and an opposing second end extending along a first axis into a respective groove;
    wherein the fiber pigtail assembly comprises:
        an optical fiber array including a plurality of individual optical fibers extending between a first end and an opposing second end;
        a fiber optic ferrule supporting the first end of end of the optical fibers; and
        a fiber lid extending between an outer lid side and an opposing inner lid side to define a first surface and an opposing second surface;
        a primary adhesion region interposed between the second surface and a portion of the optical fiber, the primary adhesion region extending from an outer edge that is adjacent the second end to an inner edge that terminates ahead of the semiconductor chip,
    wherein a distance between the inner end of the primary adhesion region and the inner side of the lid defines a compliance region that excludes the primary adhesion region.

10. The photonic device of claim 9, wherein the semiconductor chip is absent from beneath a section of the compliance region located between the inner edge of the primary adhesion region and the semiconductor chip.

11. The photonic device of claim 10, wherein the primary adhesion region of the fiber pigtail assembly has a first adhesion strength and the compliance region of the fiber pigtail assembly has a second adhesion strength that is weaker than the first adhesion strength.

12. The photonic device of claim 11, wherein the primary adhesion region has a first length and the compliant region has a second length.

13. The photonic device of claim 12, wherein the first length of the primary adhesion region ranges from about 0.6 mm to about 2.4 mm, a the length of the compliance region ranges from about 0.5 mm to about 4 mm.

14. The photonic device of claim 9, wherein an optically clear UV curable adhesive holds the optical fibers in a respective groove among the plurality of grooves.

15. The photonic device of claim 9, wherein the compliant region includes a secondary adhesive layer different from the primary adhesive layer, the primary adhesive layer having a first strength and the secondary adhesive layer having a second lower strength to enable fiber self-realignment that is less than the first tensile strength.

16. The photonic device of claim 15, wherein a first layer of adhesive has a strength to support fiber correction force and butting motion, and a second layer of adhesive is at least one of lower adhesion or stiffness with respect to the first layer to enable fiber mobility motion for the correction.

17. The photonic device of claim 9, wherein the second surface includes a gradient portion that angles the fiber lid with respect to the optical fiber array and displaces the outer lid side at a first height and the inner lid side at a second height greater than the first height.

18. A method of controlling a force applied to a fiber array included in an optical fiber pigtail assembly, the method comprising:

assembling an optical fiber array including a plurality of individual optical fibers extending between a first end and an opposing second end;

fixating the first end of the optical fibers to a fiber optic ferrule;

attaching a lower surface of a fiber lid to a portion of the optical fiber array so as to form an adhesion region and a compliance region, wherein the adhesion region includes a first adhesive layer defining a first adhesion strength, and the compliance region has a second adhesion strength that is less than the first adhesion strength.

19. The method of claim 18, wherein the adhesion region and the compliance region have adhesive strengths such that the fibers do not to exert a longitudinal force larger than 0.2 N per fiber.

20. The method of claim 18, wherein a length of the compliant region is chosen such that the fiber tips move up to about 100 um without the fibers bending radius being below about 16 mm.

* * * * *